Jan. 7, 1958  H. Q. DUGUID  2,818,995
VESSEL WITH PROTECTIVE METAL LINING
Filed Dec. 13, 1954

INVENTOR:
HOWARD Q. DUGUID
BY: Oswald H. Wilmore
HIS ATTORNEY

United States Patent Office 2,818,995
Patented Jan. 7, 1958

2,818,995

VESSEL WITH PROTECTIVE METAL LINING

Howard Q. Duguid, Darien, Conn., assignor to Shell Development Company, New York, N. Y., a corporation of Delaware Application December 13, 1954, Serial No. 474,724

4 Claims. (Cl. 220—63)

This invention relates to metallic vessels, such as tanks, pressure vessels or kettles, chemical reactors, heat exchangers, pipes, etc., which are intended for use with aggressive fluids and are protected against such fluids by a protective metal lining. More particularly, the invention relates to an improved arrangement of the lining comprising welds of protective metal joining margins of the lining and telltale holes for detecting a leak and for admitting a fluid for counteracting the tendency of the vessel to leak.

It is known to protect steel pressure vessels with protective linings laid with slots between margins of the linings and strips or battens of protective metal overlying the slots and welded to the lining; further, it is known to use as the lining composite plate, known as clad steel plate, which comprises a base plate of carbon or alloy steel to one surface of which there has been bonded, uniformly and inseparably, a cladding of metal resistant to corrosion. See U. S. patent to Watts, No. 2,209,290. It is known to provide telltale or weep holes through the outer steel vessel communnicating with the space behind the lining for detecting a leak and/or admitting a non-aggressive pressurizing fluid in the event of a leak; such holes may be connected to piping as described in the U. S. patent to Probst, No. 2,631,015.

Such prior constructions have had certain drawbacks, among them being the long and narrow path that must be traversed by the leaking fluid before reaching the telltale hole, which at times permits extensive damage to the parts of the vessel, such as the outer shell, welds and parts of the lining, if any, not made of protective metal before a leak is detected, and the considerable pressure required to force a non-corrosive fluid through the hole for flow through the leak. The outer shell is unprotected in the event of a temporary failure or plugging of the system supplying the non-corrosive pressurizing fluid. Moreover, the latter fluid does not effectively flush out the corrosive fluid from all crevices between the lining and shell wall since flow is only toward the leak, so that corrosion continues even after the flow of non-corrosive fluid is begun. Finally, any pressurizing fluid admitted through the holes acts against the entire area of the lining and tends to separate it from the outer vessel wall; this makes it necessary to control the pressure carefully in accordance with variations in the pressure prevailing in the vessel or set up considerable stresses at the welded connections. When pressurizing fluid is introduced behind the entire liner, the weakness of the liner under external pressure dictates that the lining panels be installed in narrow strips, which increases fabrication costs.

It is an object of the invention to provide an improved vessel with a welded protective metal lining wherein a telltale hole is arranged in a manner to provide a short, direct path from the region of the lining whereat a leak is most likely to occur, whereby the flow path of corrosive leaking fluid is shortened and/or the flow of non-corrosive pressurizing fluid into the vessel can be effected more readily.

A further object is to provide an improved construction for vessels of the type indicated having composite linings that are clad with protective metal wherein the telltale hole is lined with a tube, preferably also of protective metal, to restrict the flow of leaking fluid to channels bounded by corrosion-resistant surfaces.

In summary, the vessel includes an outer metal shell, e. g., of carbon or alloy steel, and a protective lining secured to the inner surface of the shell and laid so as to form slots between margins of the lining, e. g., between the margins of separate plates of the lining or between the margins of helically laid lining strips, at least the outer surface of the lining being of protective metal, a strip of protective metal laid over the slot and welded to the lining with protective weld metal, and a telltale hole extending through the shell and communicating directly with the space of the slot beneath the strip. Preferably the said slot is filled with welds connecting the lining to the shell and the telltale hole is lined with a tube of protective metal extending through the said connecting weld and welded thereto.

The invention will be described in detail with reference to the accompanying drawing forming a part of this specification and showing one preferred embodiment, wherein.

Figure 1:
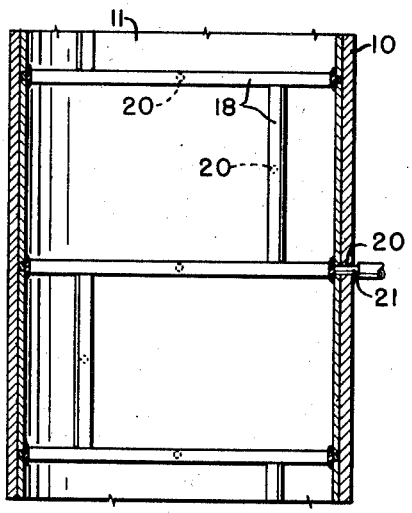
Figure 1 is a vertical sectional view through a portion of a lined vessel.

Referring to the drawings in detail, Figure 1 shows a pressure vessel having an outer steel shell 10 which may, for example, be of welded construction and has a lining 11 constituted by a plurality of separate plates. The lining plates are curved cylindrically to have one face adjacent the inner surface of the shell 10 and disposed in mutually spaced relation to provide gaps or slots intermediate their margins. The lining plates are connected to the outer shell by suitable means that include and may consist solely of welds situated in these slots, as described below. In other words, spot welds to the shell wall or to welding studs distributed over the area of the lining plates may, if desired, be provided; they are not shown since they are known and described, for example, by G. C. Carpenter in Petroleum Processing, January 1950, pp. 21–24.

The lining has at least the exposed surface thereof formed of protective metal, i. e., metal that is resistant to the aggressive fluid to be handled, e. g., stainless steel, copper, aluminum bronze, etc., depending upon the particular nature of the aggressive fluid, it being understood that the term metal is used herein to include alloys. Because some of these protective metals have high thermal coefficients of expansion correspondingly high thermal stresses are developed particularly at the welds when they are used alone as linings and welded directly to the steel shell. To alleviate this condition when vessels are to be used at high temperatures and, in some instances, to economize on the use of expensive metals, it is advantageous to use lining plates consisting of steel clad with the protective metal, also known as composite linings; while such clad plates are shown in the drawing and the invention is especially adapted thereto, the invention in its broadest aspect is not limited thereto. As understood in the art, a clad steel plate is a composite plate made up of carbon or alloy steel plate to one or both surfaces of which there has been bonded, uniformly and inseparably, a cladding of some other metal, usually 10 percent or more of the total plate thickness, the bonding being usually effected by hot or cold rolling blocks of the two metals that have been juxtaposed with metallurgically clean faces or with an alloying metal and the margins of which have been sealed by welding.

Figure 4:
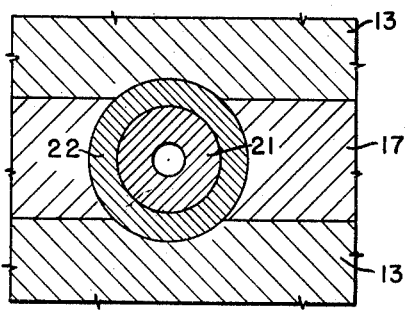
Figure 4 is a fragmentary section taken on the line 4—4 of Figure 3.
Figure 2:
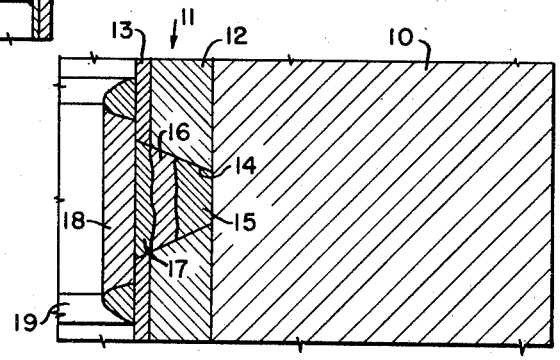
Figure 2 is an enlarged vertical sectional view showing the details of the connection and welds.
Figure 3:
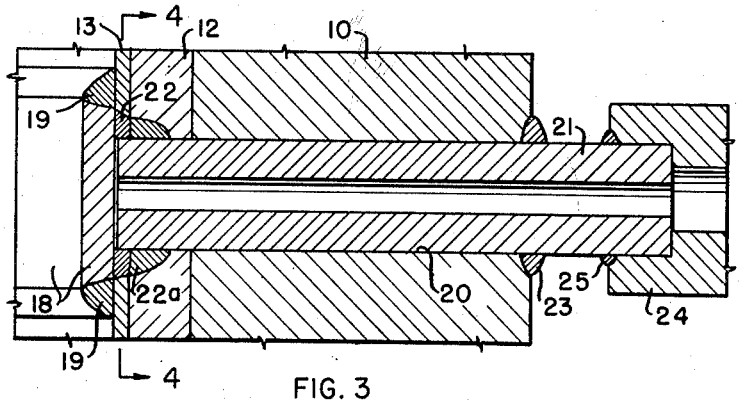
Figure 3 is a view similar to Figure 2 but taken at another section passing through a telltale hole.

In the embodiment illustrated, the lining consists of a carbon steel base plate 12 to which there has been bonded a thinner plate 13 of deoxidized copper that constitutes the protective metal, and the margins thereof are preferably cut to a bevel indicated at 14 to leave a slot. The weld connecting the lining plates to the shell wall in this case includes a steel weld 15 filling the base of the slot and joining the steel of the shell to the steel base plate of the composite lining; this weld, which constitutes the connecting means proper, may be applied in one or more passes and is preferably continuous. In the preferred arrangement, the weld 15 is covered by one or more welds that cover the steel weld and thereby protect it against the action of aggressive fluid. Thus, a continuous silicon-bronze (or Monel metal) weldment 16 may be placed on the weld 15, followed by a continuous final weldment 17 of deoxidized copper situated between the copper layers 13. The weldment 16 is provided mainly to provide a layer of reduced iron content so that the anti-corrosive properties of the final weldment are not adversely affected by pickup of iron. A closure strip or batten 18 of deoxidized copper, of sufficient width to span the slot and lie flat against the exposed faces of the adjoining lining plates and preferably somewhat thicker than the layer 13, is connected to the lining by continuous fillet welds 19, also of deoxidized copper. While Figures 2–4 show in detail a horizontal seam between lining plates, it should be noted that the same details are used for the vertical seams, as indicated in Figure 1. The lining seams are advantageously located so as not to coincide with seams in the shell 10.

Some and, preferably, all of the seams are provided with one or more telltale holes 20 that extend through the shell wall into the slot and through the welds therein so as to communicate directly with the space in the slot immediately beneath the batten 18. In the preferred embodiment this hole is lined with a copper tube 21 that is fitted prior to attaching the batten 18. The hole 20 in the outer shell may be drilled before or after attaching the lining and is extended toward the inside of the vessel by drilling through the welds 15–17 and through parts of the bevelled margins of the lining plates, as shown in Figures 3 and 4. The tube is then sealed by a peripheral weld 22a against the steel plate 12, covered by a protective continuous peripheral weld 22 against the weldment 17; this may extend to the layer 13 of the lining. The welds 22a and 22 may be silicon-bronze (or Monel metal) and deoxidized copper, respectively. The tube is further welded to the outer shell by a peripheral silicon-bronze weld 23. A stainless steel welding socket 24 is brazed to the outer end of the tube 21, as indicated at 25, for connecting the tube to a detecting and/or pressurizing system, e. g., of the type described in the aforesaid U. S. patent to Probst, No. 2,631,015. The system may, for example, include means for admitting an inert pressurizing fluid, either a gas or a liquid, through the tubes 21 at a pressure less than that prevailing within the vessel so as to be displaced outwardly in the event of a leak, and a pressure-sensitive device for detecting leakage and/or may include means for forcing a pressurizing fluid, such as the non-aggressive reactant that is a component of the mixture undergoing a chemical reaction within the vessel, inwards at a higher pressure after a leak has been detected to permit the vessel to continue in service until the next scheduled shut-down.

It should be understood that the specific weld metals mentioned above are applicable to the case wherein the protective metal is copper, and that other weld metals would be used with other protective metals.

It is evident that a leak is most apt to occur in the vicinity of the welds 19, where stresses are most severe, and where exposed metal is most subject to corrosive attack, weld metal usually being considered less perfect than parent metal because of possible porosity or cracks. Thus, if the vessel is substantially unstressed at normal temperature and is used under pressure at a temperature of, say, 400 to 600° F., considerable thermal stresses occur tending to cause checks after repeated cycles of heating and cooling. The telltale hole communicates directly with the space beneath the batten 18, into which space the leaking fluid first enters. Since the batten is not welded to the last weldment 17 such fluid or the inert pressurizing fluid displaced thereby is able to creep under the batten to the nearest telltale hole. Thus the leak can be detected without flow of the aggressive fluid through any passage within the vessel that is bounded by metal subject to attack by such aggressive fluid. Similarly, when a non-corrosive pressurizing fluid is forced into the telltale hole at a pressure in excess of the fluids contained in the vessel, it will readily find its way to the leak and enter the vessel so as to prevent or greatly reduce the further flow of aggressive fluid. In case of temporary failure or plugging of the system carrying the non-corrosive pressurizing fluid, weldment 17 protects the outer shell against the action of the aggressive fluid. A further advantage is that the pressurizing fluid and the inert fluid act only on a limited area of the lining, specifically, behind the batten strips 18, so that less stress tending to separate the lining from the vessel wall 10 is set up. Only minor stresses tending to move the battens out from the larger lining plates are, therefore, set up and it is not necessary to exercise great care in applying only a pressure through the telltale holes in accordance with the pressure prevailing in the vessel. By limiting the back pressure to those parts which are resistant to external pressure, the size of the lining panels is not limited by the back pressure. Fabrication costs are reduced by the use of larger panels, which reduces the amount of welding required.

I claim as my invention:

1. A metallic vessel having a steel outer shell; a protective metal lining disposed within the shell with one face thereof adjacent the inner surface of the shell, said lining being formed of several pieces and laid with the margins thereof spaced apart to provide an intervening slot; means comprising welds of protective metal within said slot between the steel shell and said margins of the lining connecting the lining to the outer shell, said welds covering completely the surface of the shell between said margins; a strip of protective metal disposed against the other face of the lining and spanning said slot; and continuous welds of protective metal joining said strip to the said other face of the lining, said shell and the welds within said slot having a telltale hole extending therethrough and through said welds and communicating directly with the space immediately beneath said strip.

2. A metallic vessel according to claim 1 including a tube of protective metal extending inwardly through said telltale hole and forming a lining therefor.

3. A metallic vessel having a steel outer shell; a composite lining comprising a steel base plate and a layer of protective metal uniformly and inseparably bonded to the base plate disposed within said shell with the surface of said base plate adjacent the inner surface of the shell, said lining being formed with a slot between adjoining edges thereof; means connecting the lining to the outer shell, said means including base welds within said slot between the steel shell and the said margins of the lining at the steel base plate and a protective metal weld situated within the slot and extending continuously between the margins of said layer of protective metal of the lining so as to cover completely the base welds and the surface of the shell between said margins; a tube of protective metal extending inwardly through said steel shell and through the said weld of protective metal; a continuous, peripheral weld of protective metal about inner end of said tube joined to said protective metal weld; a strip of protective metal disposed against the said layer of protective metal and spanning the said slot to cover the said welds therein and the tube; and continuous welds of protective metal joining said strip to the said layer of protective metal.

4. A metallic vessel according to claim 3 including a weld between said tube and the steel base plate immediately beneath said peripheral weld of protective metal.

References Cited in the file of this patent

UNITED STATES PATENTS

| | | |
|---|---|---|
| 437,384 | Schaefer | Sept. 30, 1890 |
| 1,825,154 | McDermott | Sept. 29, 1931 |
| 1,992,470 | Carlstrom | Feb. 26, 1935 |
| 2,020,630 | Anderson | Nov. 12, 1935 |
| 2,209,290 | Watts | July 23, 1940 |
| 2,631,015 | Probst | Mar. 10, 1953 |

FOREIGN PATENTS

| | | |
|---|---|---|
| 455,595 | Great Britain | Oct. 23, 1936 |